(12) United States Patent
Perez et al.

(10) Patent No.: US 7,703,957 B2
(45) Date of Patent: Apr. 27, 2010

(54) METHOD FOR UTILIZING INSTRUMENT CLUSTER BACKLIGHTING FOR DYNAMIC STYLING

(75) Inventors: Alfredo Perez, Belleville, MI (US); Stephen Betts, Canton, MI (US); David Frye, Berkley, MI (US); Mark Endicott, Ann Arbor, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 194 days.

(21) Appl. No.: 11/869,446

(22) Filed: Oct. 9, 2007

(65) Prior Publication Data

US 2009/0091911 A1    Apr. 9, 2009

(51) Int. Cl.
*B60Q 3/04* (2006.01)
(52) U.S. Cl. ...................... 362/489; 362/488
(58) Field of Classification Search ................ 362/488, 362/489
See application file for complete search history.

(56) References Cited

U.S. PATENT DOCUMENTS

| | | | |
|---|---|---|---|
| 4,306,218 A | 12/1981 | LeConte et al. | |
| 6,025,820 A | 2/2000 | Salmon et al. | |
| 6,441,726 B1 * | 8/2002 | Voto et al. | 340/438 |
| 6,452,582 B1 | 9/2002 | Rolston | |
| 6,702,229 B2 | 3/2004 | Anderson et al. | |
| 6,762,741 B2 | 7/2004 | Weindorf | |
| 7,015,891 B2 | 3/2006 | Lo | |
| 7,124,004 B2 | 10/2006 | Obradovich | |
| 2004/0085746 A1 * | 5/2004 | Chen | 362/489 |
| 2004/0213008 A1 * | 10/2004 | Bayersdorfer et al. | 362/491 |

* cited by examiner

*Primary Examiner*—David V Bruce
(74) *Attorney, Agent, or Firm*—Fraser Clemens Martin & Miller LLC; J. Douglas Miller

(57) ABSTRACT

A backlighting system and a method for utilizing instrument cluster backlighting for a dynamic styling are disclosed, wherein the backlighting system comprises a plurality of light sources separated into a plurality of light zones, adjacent light zones having walls disposed therebetween, wherein the walls militate against the light emitted in each zone from radiating into an adjacent zone. A controller is in electrical communication with the light source to produce the dynamic styling of the light zones, thereby providing the operator with a situational warning in response to a vehicle condition.

17 Claims, 2 Drawing Sheets

METHOD FOR UTILIZING INSTRUMENT CLUSTER BACKLIGHTING FOR DYNAMIC STYLING

FIELD OF THE INVENTION

The present invention relates to a vehicle instrument cluster, and more particularly, to a backlighting system and a method for utilizing instrument cluster backlighting for dynamic styling.

BACKGROUND OF THE INVENTION

Vehicle instrument clusters found in automobiles, trucks, watercraft, and aircraft, for example, include a means of artificial backlighting. Artificial backlighting permits the operator and occupants of a vehicle to view the instrument cluster in conditions of low light or low visibility. Instrument clusters frequently include an illuminated warning system to indicate to the operator of the vehicle that a particular parameter reading, such as a speedometer, a tachometer, an oil pressure indicator, and a temperature indicator, for example, is not in a desired range.

Screen printing is currently utilized as a process to create an instrument cluster appliqué. The appliqué is disposed above an artificial backlighting to provide a desired illumination affect. Fade patterns in the illumination are achieved by printing a dot pattern on the appliqué using screen printing technology. The dot pattern is visible to the end customer, thereby causing a non-desirable appearance.

Warnings are currently achieved by separate warning lights, text displayed on a message center display, and by changing the backlighting attributes such as a solid backlighting, a flashing backlighting, and a color change of the backlighting, for example. Due to increased driver distractions, there is a need for a dynamic warning system to alert a driver of a vehicle condition.

It would be desirable to develop a backlighting system and a method for utilizing instrument cluster backlighting for a dynamic styling, wherein the dynamic styling provides the operator with a situational warning in response to a vehicle condition.

SUMMARY OF THE INVENTION

Concordant and consistent with the present invention, a backlighting system and a method for utilizing instrument cluster backlighting for a dynamic styling, wherein the dynamic styling provides the operator with a situational warning in response to vehicle condition has surprisingly been discovered.

In one embodiment a backlighting system comprises a plurality of light zones arranged in a desired pattern, each of the light zones separated from other of the light zones by a wall; a light source disposed in each of the light zones, wherein the wall militates against radiation of light from one of the light zones into another of the light zones; and a controller in electrical communication with each of the light sources, the controller adapted to control an intensity of the light sources.

In another embodiment a backlighting system comprising a plurality of light zones arranged in a desired pattern, each of the light zones separated from other of the light zones by a wall; a plurality of light sources disposed in the light zones, wherein the wall militates against radiation of light from one of the light zones into another of the light zones; a printed wiring board in electrical communication with the light sources; and a controller in electrical communication with the light sources and adapted to sequentially vary an intensity of the light sources to produce a desired lighting effect.

The invention also provides methods for utilizing backlighting in an instrument cluster for dynamic styling.

One method comprises the steps of providing a backlighting system including a plurality of light sources, a printed wiring board, and a controller, wherein the light sources are in electrical communication with the printed wiring board and the controller; separating each of the light sources into one of a plurality of light zones, wherein adjacent zones are separated by a wall which militates against a radiation of light from one of the light zones into another of the light zones; and controlling an intensity of the light sources independently to selectively create a desired lighting effect.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
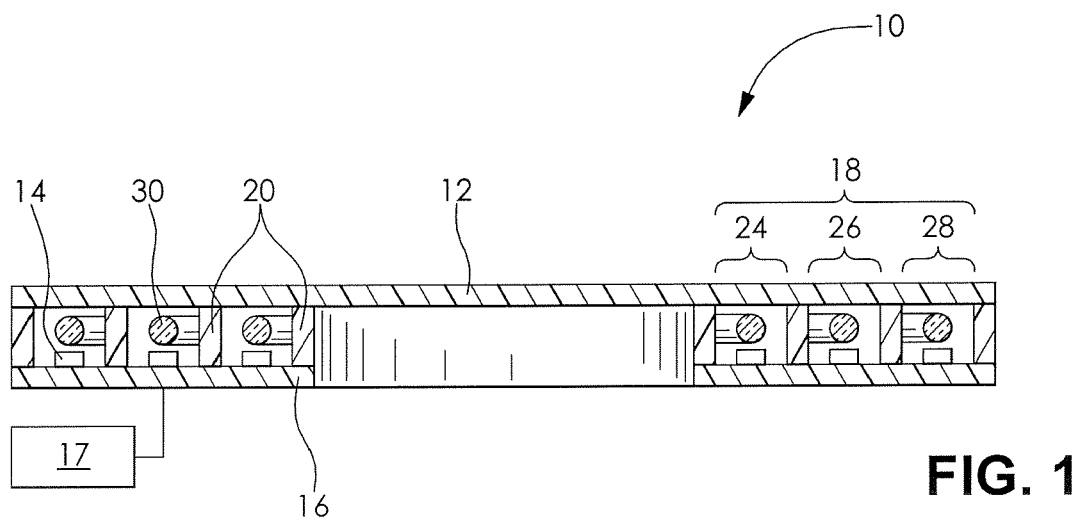
FIG. 1 shows a schematic cross-sectional view of a backlighting system according to an embodiment of the invention.

FIG. 1 illustrates a backlighting system 10 for a vehicle, disposed adjacent a rear side of an appliqué 12. A front side of the appliqué 12 typically includes a plurality of graphics to indicate vehicle conditions to an operator thereof. The backlighting system 10 includes a plurality of light sources 14, a printed wiring board (PWB) 16, and a controller 17. The light sources 14 may be any conventional light sources such as LEDs, for example. The light sources 14 are separated into a plurality of light zones 18. The PWB 16 may be formed from any conventional PWB 16 material such as FR4, for example. The PWB 16 is in electrical communication with the light sources 14 and the controller 17. The controller 17 is adapted to independently control each of the light sources 14. It is understood that the controller 17 may be any conventional controller such as a computer controller, for example.

Figure 2:
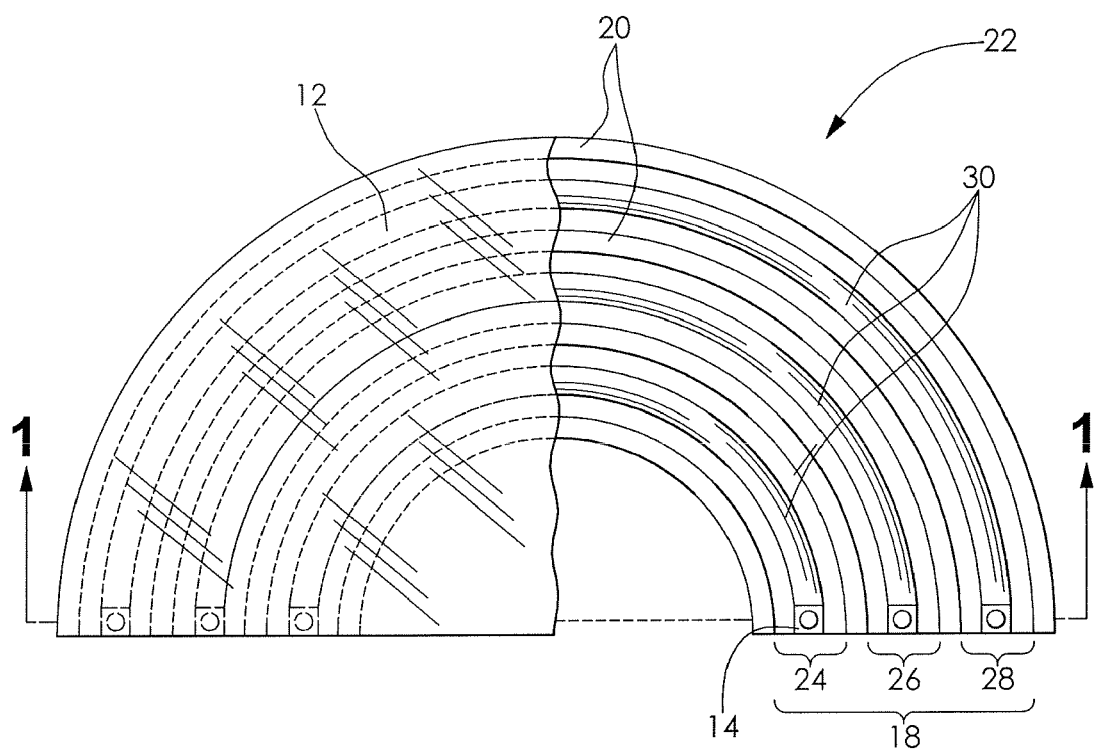
FIG. 2 shows a schematic fragmentary front elevational view of the backlighting system shown in FIG. 1.

As more clearly shown in FIG. 2, the plurality of light zones 18 is conformed to the shape of an instrument display 22 in the appliqué 12. It is understood that the instrument display 22 may be any conventional instrument display such as a temperature gauge, a speedometer, and a tachometer, for example. As illustrated, the instrument display 22 is separated into a first zone 24, a second zone 26, and a third zone 28, each having an annular shape. It is understood that the light zones 24, 26, 28 may have other shapes such as arcuate and linear, for example, and that more or fewer light zones 24, 26, 28 can be used as desired. The light zones 24, 26, 28 are separated by walls 20 which militate against light emitted in one light zone from radiating into an adjacent light zone.

In a particular embodiment, the light sources 14 are light emitting diodes (LEDs), each of the LEDs disposed in a light pipe 30, as shown in FIG. 1 and FIG. 2. The light emitted from the light sources 14 travels through the light pipe 30 and illuminates the associated one of the light zones 24, 26, 28. It is understood that the light pipes 30 may be any conventional light pipe such as a molded plastic light pipe and optical fibers, for example.

In operation, the light sources 14 emit light into the light pipes 30. The light travels through the light pipe 30 to illuminate the associated light zone 24, 26, 28. The controller 17 varies a light intensity, also referred to as brightness, of each light zone 24, 26, 28 independently to create a desired lighting effect. Lighting effects may include a solid illumination, a flash, a step lighting, and an undulation effect, for example. By varying the duty cycle of adjacent light zones 24, 26, 28, a sequence of light intensity variation creates an undulation or a ripple effect. The ripple effect is created when the controller 17 sequentially varies the intensities of the light sources 14 in each light zone 24, 26, 28 from a center of the instrument display 22 to a perimeter of the instrument display 22. Specifically, the controller 17 increases the intensity of the light sources 14 in the first zone 24 until a desired level of intensity is reached. Once the light sources 14 in the first zone 24 reach the desired level of intensity, the controller 17 increases the intensity of the light sources 14 in the second zone 26 to match the level of intensity of the light sources 14 in the first zone 24. Once the light sources 14 in the second zone 26 reach the desired level of intensity, the controller 17 increases the intensity of the light sources 14 in the third zone 28 to match the intensity of the light sources 14 in the second zone 26, while simultaneously decreasing the intensity of the light sources 14 in the first zone 24. Once the light sources 14 in the third zone 28 reach a desired level of intensity, the controller 17 decreases the intensity of the light sources 14 in the second zone 26. It is understood that the controller 17 may sequentially vary the intensity of the light sources 14 in each of the light zones 24, 26, 28 from the perimeter to the center. Alternatively, the controller 17 may vary the intensity of the light sources 14 of any particular light zone 24, 26, 28 and in any particular sequence, to provide a desired lighting effect.

Figure 3:
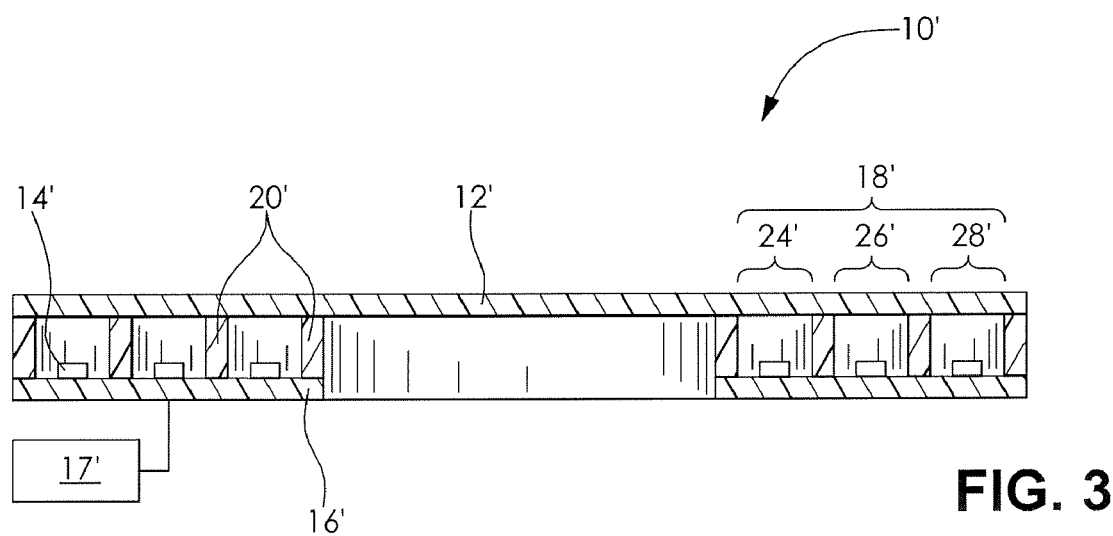
FIG. 3 shows a schematic cross-sectional view of a backlighting system according to another embodiment of the invention.

FIG. 3 illustrates a backlighting system 10' for a vehicle, disposed adjacent a rear side of an appliqué 12'. Structure repeated from the description of FIGS. 1 and 2 includes the same reference numeral and a prime (') symbol. A front side of the appliqué 12' typically includes a plurality of graphics to indicate vehicle conditions to an operator thereof. The backlighting system 10' includes a plurality of light sources 14', a printed wiring board (PWB) 16', and a controller 17'. The light sources 14' may be any conventional light sources such as LEDs, for example. The light sources 14' are separated into a plurality of light zones 18'. The PWB 16' may be formed from any conventional PWB 16' material such as FR4, for example. The PWB 16' is in electrical communication with the light sources 14' and the controller 17'. The controller 17' is adapted to independently control each of the light sources 14'. It is understood that the controller 17' may be any conventional controller such as a computer controller, for example.

As more clearly shown in FIG. 2, the plurality of light zones 18' is conformed to the shape of an instrument display 22' in the appliqué 12'. It is understood that the instrument display 22' may be any conventional instrument display such as a temperature gauge, a speedometer, and a tachometer, for example. As illustrated, the instrument display 22' is separated into a first zone 24', a second zone 26', and a third zone 28', each having an annular shape. It is understood that the light zones 24', 26', 28' may have other shapes such as arcuate and linear, for example, and that more or fewer light zones 24', 26', 28' can be used as desired. The light zones 24', 26', 28' are separated by walls 20' which militate against light emitted in one light zone from radiating into an adjacent light zone.

Figure 4:
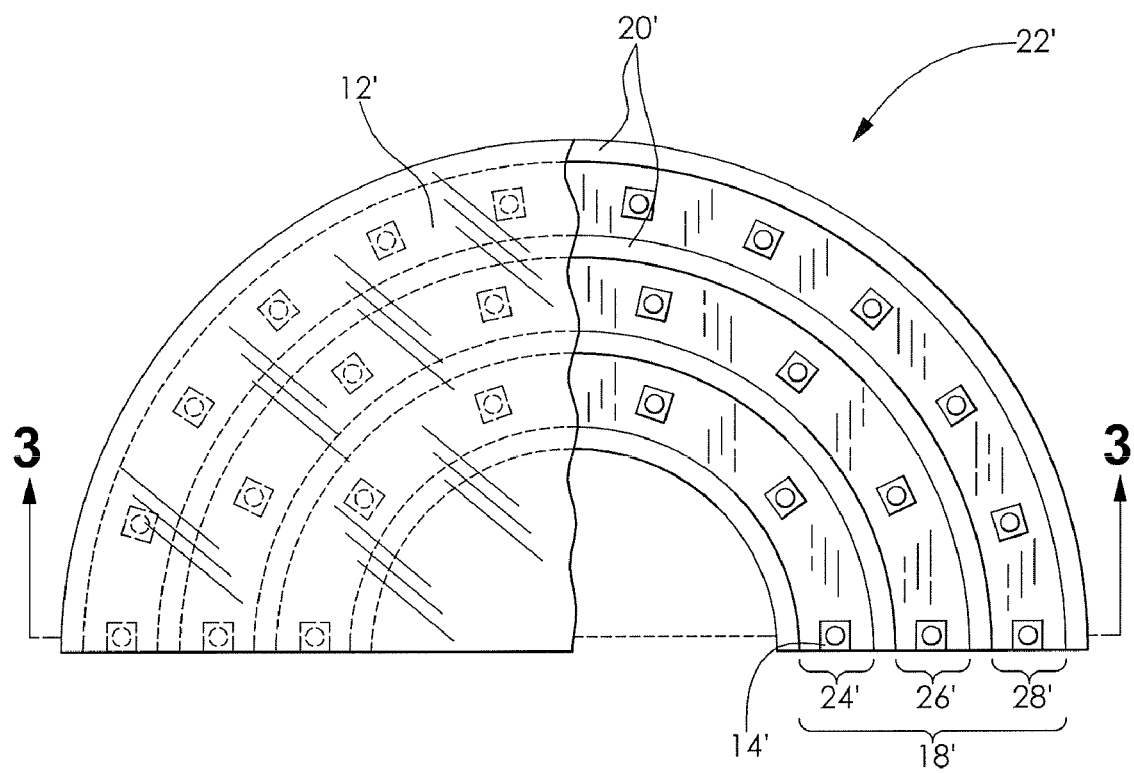
FIG. 4 shows a schematic fragmentary front elevational view of the backlighting system shown in FIG. 3.

In a particular embodiment, shown in FIG. 3 and FIG. 4, the light sources 14' are LEDs disposed in a desired lighting pattern. It is understood that the desired lighting pattern may be any pattern such as annular, linear, and arcuate for example. The light sources 14' are separated into light zones 24', 26', 28' wherein the light emitted from the light sources 14' in a particular light zone 24', 26', 28' will illuminate the associated one of the light zones 24', 26', 28' without radiating into an adjacent light zone.

In operation, the light sources 14' emit light to illuminate the associated light zones 24', 26', 28'. The controller 17' varies a light intensity of the light sources 14' in each light zone 24', 26', 28' independently to create a desired lighting effect. Lighting effects may include a solid illumination, a flash, a step lighting, and an undulation effect, for example. By varying the duty cycle of adjacent light zones 24', 26', 28' a sequence of light intensity variation creates an undulation or ripple effect. The ripple effect is created when the controller 17' sequentially varies the intensities of the light sources 14' in each light zone 24', 26', 28' from a center of the instrument display 22' to a perimeter of the instrument display 22'. Specifically, the controller 17' increases the intensity of the light sources 14' in the first zone 24' until a desired level of intensity is reached. Once the light sources 14' in the first zone 24' reach the desired level of intensity, the controller 17' increases the intensity of the light sources 14' in the second zone 26' to match the level of intensity of the light sources 14' in the first zone 24'. Once the light sources 14' in the second zone 26' reach the desired level of intensity, the controller 17' increases the intensity of the light sources 14' in the third zone 28' to match the intensity of the light sources 14' in the second zone 26', while simultaneously decreasing the intensity of the light sources 14' in the first zone 24'. Once the light sources 14' in the third zone 28' reach a desired level of intensity, the controller 17' decreases the intensity of the light sources 14' in the second zone 26'. It is understood that the controller 17' may sequentially vary the intensity of the light sources 14' in each of the light zones 24', 26', 28' from the perimeter to the center. Alternatively, the controller 17' may vary the intensity of the light sources 14' in any particular light zone 24', 26', 28' and in any particular sequence to provide a desired lighting effect.

The backlighting system and method according to the present invention provide the operator with a dynamic warning system for various vehicle conditions. The dynamic warnings draw the attention of the driver using various desired lighting effects. The desired lighting effects further provide custom effects such as a perimeter-to-center effect during start-up, for example.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A backlighting system, comprising;
an instrument gauge having an appliqué;

a plurality of light zones disposed adjacent a rear side of the appliqué of the instrument gauge, each of the light zones separated from other of the light zones by a wall, wherein the light zones collectively conform to a shape of the instrument gauge to backlight the instrument gauge;

a light source disposed in each of the light zones, wherein the wall militates against radiation of light from one of the light zones into another of the light zones; and a controller in electrical communication with each of the light sources, the controller adapted to control an intensity of the light sources.

2. The backlighting system according to claim 1, wherein the controller independently varies the intensity of each of the light sources.

3. The backlighting system according to claim 1, wherein the light sources are light emitting diodes, each of the light emitting diodes disposed adjacent a plurality of light pipes.

4. The backlighting system according to claim 1, wherein each of the light sources is a light emitting diode.

5. The backlighting system according to claim 1, wherein each of the light zones have a substantially annular shape when viewed in elevation.

6. The backlighting system according to claim 1, wherein the controller is adapted to sequentially vary the intensity of the light sources to produce a desired light effect.

7. A backlighting system, comprising;

a plurality of light zones arranged in a desired pattern, each of the light zones separated from other of the light zones by a wall;

a plurality of light sources disposed in the light zones, wherein the wall militates against radiation of light from one of the light zones into another of the light zones;

a printed wiring board in electrical communication with the light sources; and a controller in electrical communication with the light sources and adapted to sequentially vary an intensity of the light sources to produce a desired lighting effect, wherein the desired lighting effect is one of a ripple effect, a center-to-perimeter effect, and a perimeter-to-center effect.

8. The backlighting system according to claim 7, wherein the controller independently varies the intensity of each of the light sources.

9. The backlighting system according to claim 7, wherein the light sources are light emitting diodes disposed in a plurality of light pipes.

10. The backlighting system according to claim 7, wherein the light sources are light emitting diodes disposed in a desired pattern.

11. The backlighting system according to claim 7, wherein the light zones generally conform to a shape of an instrument display.

12. The backlighting system according to claim 7, wherein the light sources are disposed adjacent a rear side of an instrument cluster appliqué.

13. A method for utilizing backlighting in an instrument cluster for dynamic styling, the method comprising the steps of:

providing a backlighting system including a plurality of light sources, a printed wiring board, and a controller, wherein the light sources are in electrical communication with the printed wiring board and the controller;

separating each of the light sources into one of a plurality of light zones, wherein adjacent zones are separated by a wall which militates against a radiation of light from one of the light zones into another of the light zones; and controlling an intensity of the light sources independently to selectively create a desired lighting effect, wherein the desired lighting effect is one of a ripple effect, a center-to-perimeter effect, and a perimeter-to-center effect.

14. The method according to claim 13, wherein the backlighting system is disposed adjacent a rear side of an instrument cluster appliqué.

15. The method according to claim 13, wherein the light sources are light emitting diodes, the light emitting diodes disposed in a plurality of light pipes.

16. The method according to claim 13, wherein the light sources are light emitting diodes disposed in a desired pattern.

17. The method according to claim 13, wherein the light zones generally conform to a shape of an instrument display.

* * * * *